(12) United States Patent
Betz et al.

(10) Patent No.: US 6,872,765 B1
(45) Date of Patent: Mar. 29, 2005

(54) SOL-GEL COATING FOR SINGLE-LAYER OR MULTI-LAYER VARNISHES

(75) Inventors: Peter Betz, Münster (DE); Horst Hintze-Brüning, Münster (DE); Wilfried Stübbe, Greven (DE); Heinz-Peter Rink, Münster (DE)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 09/914,937

(22) PCT Filed: Mar. 6, 2000

(86) PCT No.: PCT/EP00/01932

§ 371 (c)(1),
(2), (4) Date: Nov. 8, 2001

(87) PCT Pub. No.: WO00/53683

PCT Pub. Date: Sep. 14, 2000

(30) Foreign Application Priority Data

Mar. 6, 1999 (DE) .......................... 199 09 894

(51) Int. Cl.$^7$ .............................................. C08K 5/24
(52) U.S. Cl. ...................... 524/261; 524/236; 524/243; 524/262; 524/264; 524/265
(58) Field of Search ................................. 524/236, 243, 524/261, 262, 264, 265

(56) References Cited

U.S. PATENT DOCUMENTS

| | | | |
|---|---|---|---|
| 3,639,147 A | 2/1972 | Benefiel et al. ................ 117/73 |
| 3,953,644 A | 4/1976 | Camelon et al. ............ 428/220 |
| 4,220,679 A | 9/1980 | Backhouse .................. 427/401 |
| 4,246,382 A | 1/1981 | Honda et al. .................. 526/79 |
| 4,268,542 A | 5/1981 | Sakakibara et al. .......... 427/195 |
| 4,489,135 A | 12/1984 | Drexler et al. ............ 428/423.1 |
| 4,576,868 A | 3/1986 | Poth et al. ................ 428/423.1 |
| 4,675,234 A | 6/1987 | Sachs et al. ................ 428/328 |
| 4,719,132 A | 1/1988 | Porter, Jr. .................... 427/409 |
| 4,730,020 A | 3/1988 | Wilfinger et al. ........... 524/555 |
| 4,746,366 A | 5/1988 | Philipp et al. ......... 106/287.19 |
| 4,754,014 A | 6/1988 | Ryntz et al. ................... 528/28 |
| 4,851,460 A | 7/1989 | Stranghöner et al. ....... 523/407 |
| 4,880,867 A | 11/1989 | Gobel et al. ................ 524/507 |
| 4,895,910 A | 1/1990 | Isozaki et al. ............ 525/326.5 |
| 4,914,148 A | 4/1990 | Hille et al. .................. 524/507 |
| 4,945,128 A | 7/1990 | Hille et al. .................. 524/591 |
| 4,981,759 A | 1/1991 | Nakatani et al. ............ 428/626 |
| 5,075,372 A | 12/1991 | Hille et al. .................. 524/839 |
| 5,079,312 A | 1/1992 | Isozaki et al. .............. 525/479 |
| 5,221,329 A | 6/1993 | Tarr |
| 5,233,006 A | 8/1993 | Wolter et al. |
| 5,236,995 A | 8/1993 | Salatin et al. ................ 524/591 |
| 5,262,362 A | 11/1993 | Covino-Hrvacek .......... 501/12 |
| 5,334,420 A | 8/1994 | Hartung et al. .......... 427/407.1 |
| 5,342,882 A | 8/1994 | Göbel et al. ................ 524/832 |
| 5,356,669 A | 10/1994 | Rehfuss et al. .......... 427/407.1 |
| 5,368,944 A | 11/1994 | Hartung et al. .......... 428/423.1 |
| 5,385,988 A | 1/1995 | Yamamoto et al. |
| 5,412,016 A | 5/1995 | Sharp |
| 5,418,264 A | 5/1995 | Obloh et al. |
| 5,425,970 A | 6/1995 | Lahrmann et al. .......... 427/493 |
| 5,447,998 A | 9/1995 | Grady et al. |
| 5,474,811 A | 12/1995 | Rehfuss et al. .......... 427/407.1 |
| 5,516,559 A | 5/1996 | Röckrath et al. ........ 427/407.1 |
| 5,569,705 A | 10/1996 | Vogt-Birnbrich et al. ... 524/591 |
| 5,571,861 A | 11/1996 | Klein et al. ................ 524/591 |
| 5,576,386 A | 11/1996 | Kempter et al. .............. 526/88 |
| 5,601,878 A | 2/1997 | Kranig et al. ............... 427/386 |
| 5,601,880 A | 2/1997 | Schwarte et al. ........ 427/407.1 |
| 5,605,965 A | 2/1997 | Rehfuss et al. ............. 525/100 |
| 5,654,691 A | 8/1997 | Göbel et al. .................. 528/71 |
| 5,670,257 A | 9/1997 | Sakai et al. |
| 5,690,569 A | 11/1997 | Ledvina et al. ............. 474/111 |
| 5,691,419 A | 11/1997 | Engelke et al. ............. 525/208 |
| 5,691,425 A | 11/1997 | Klein et al. ................. 525/455 |
| 5,716,678 A | 2/1998 | Röckrath et al. ........ 427/407.1 |
| 5,717,125 A | 2/1998 | Wolter et al. |
| 5,726,258 A | 3/1998 | Fischer et al. ................ 526/64 |
| 5,760,128 A | 6/1998 | Baltus et al. |
| 5,789,085 A | 8/1998 | Blohowiak et al. ......... 428/450 |
| 5,853,809 A | 12/1998 | Campbell et al. |
| 5,965,213 A | 10/1999 | Sacharski et al. ........... 427/475 |
| 5,973,068 A | 10/1999 | Yamaya et al. |
| 5,989,687 A | 11/1999 | Li |
| 5,998,504 A | 12/1999 | Groth et al. |

(Continued)

FOREIGN PATENT DOCUMENTS

| | | | |
|---|---|---|---|
| CA | 2033530 | 7/1991 | |
| CA | 2073115 | 8/2001 | ......... C09D/175/14 |
| CA | 2073814 | 8/2001 | ......... C09D/163/00 |

(Continued)

OTHER PUBLICATIONS

English Language Abstract for DE19910876 from EPO, Oct. 5, 2000.

(Continued)

Primary Examiner—Edward J. Cain

(57) ABSTRACT

The invention relates to a sol-gel coating material containing (A) an acrylate copolymer solution containing at least one acrylate copolymer (A1); (B) a parent varnish which can be prepared by hydrolysis and condensation of at least one hydrolysable silane (B1) of the general formula (I) $SiR_4$, in which the variable R=hydrolysable groups, hydroxy groups and non-hydrolysable groups, provided that there should be at least one, preferably two, hydrolysable groups; and (C) an additive solution containing c1) at least one ethylenically unsaturated compound containing at least one epoxide group; c2) at least one silane (B1) with at least one non-hydrolysable group R presenting at least one epoxide group; and c3) at least one adduct of at least one silane (B1) with at least one non-hydrolysable group R presenting at least one amino group and at least one cyclic ethylenically unsaturated dicarboxylic acid anhydride. The invention also relates to the use of said sol-gel coating material for producing scratchproof sol-gel coatings.

33 Claims, No Drawings

U.S. PATENT DOCUMENTS

| | | | |
|---|---|---|---|
| 6,001,424 A | 12/1999 | Lettmann et al. | 427/407.1 |
| 6,001,915 A | 12/1999 | Schwarte et al. | 524/457 |
| 6,159,556 A | 12/2000 | Möller et al. | 427/475 |
| 6,288,198 B1 | 9/2001 | Mechtel et al. | |
| 6,419,989 B1 * | 7/2002 | Betz et al. | 427/385.5 |
| 6,620,514 B1 | 9/2003 | Arpac et al. | |
| 6,713,559 B1 | 3/2004 | Armbrust et al. | |
| 2004/0110012 A1 | 6/2004 | Bier et al. | |

FOREIGN PATENT DOCUMENTS

| | | | |
|---|---|---|---|
| CA | 2078650 | 8/2001 | C09D/133/00 |
| CA | 2079498 | 8/2001 | B05D/3/06 |
| CA | 2102169 | 8/2001 | C09D/133/00 |
| CA | 2102170 | 8/2001 | C09D/133/00 |
| CA | 2104845 | 8/2001 | C09D/161/00 |
| CA | 2127761 | 8/2001 | C09D/175/04 |
| CA | 2190286 | 8/2001 | C09D/167/00 |
| CA | 2220465 | 8/2001 | C09D/5/03 |
| DE | 28 18 100 A1 | 11/1978 | B05D/7/18 |
| DE | 28 48 906 A1 | 5/1979 | C08F/20/18 |
| DE | 33 33 072 A1 | 3/1985 | C09D/3/72 |
| DE | 37 06 095 A1 | 8/1987 | C08G/77/20 |
| DE | 36 28 124 A1 | 3/1988 | C09D/3/727 |
| DE | 38 07 571 A1 | 9/1988 | C08L/83/07 |
| DE | 38 14 853 A1 | 11/1988 | C25D/13/06 |
| DE | 38 28 098 A1 | 3/1990 | C08G/77/58 |
| DE | 3836815 | 7/1990 | |
| DE | 39 03 804 A1 | 8/1990 | C09D/175/06 |
| DE | 40 11 045 A1 | 10/1991 | |
| DE | 40 20 316 A1 | 1/1992 | C09D/183/04 |
| DE | 40 25 215 A1 | 2/1992 | C08G/59/50 |
| DE | 41 22 743 C1 | 11/1992 | C09D/4/00 |
| DE | 42 04 518 A1 | 8/1993 | B05D/1/36 |
| DE | 42 22 194 A1 | 1/1994 | C09D/5/46 |
| DE | 43 03 570 A1 | 8/1994 | B05D/7/26 |
| DE | 44 21 823 A1 | 1/1996 | C09D/175/04 |
| DE | 34 07 087 A1 | 9/1996 | C09D/3/82 |
| DE | 196 13 547 A1 | 11/1996 | C09D/5/46 |
| DE | 195 24 182 A1 | 1/1997 | C08F/212/08 |
| DE | 196 18 657 A1 | 1/1997 | C09D/5/46 |
| DE | 197 09 476 A1 | 11/1997 | F16H/7/18 |
| DE | 197 09 465 A1 | 9/1998 | B05D/7/26 |
| DE | WO 99/50359 | 7/1999 | C09D/5/00 |
| DE | 199 12 661 A1 | 11/1999 | C09D/5/03 |
| DE | 19910876 | 10/2000 | |
| EP | 0 008 127 A1 | 8/1979 | E21F/17/00 |
| EP | 0 038 127 A1 | 3/1981 | B05D/7/26 |
| EP | 0 069 936 A2 | 7/1982 | C09D/3/00 |
| EP | 0 089 497 A2 | 2/1983 | C09D/3/72 |
| EP | 0 228 003 A1 | 1/1986 | B05D/7/16 |
| EP | 0 195 931 A1 | 2/1986 | C09D/3/80 |
| EP | 0 234 361 A1 | 2/1987 | C08G/18/08 |
| EP | 0 234 362 A1 | 2/1987 | C08G/18/08 |
| EP | 0249 201 A2 | 6/1987 | C09D/3/58 |
| EP | 0 256 540 A2 | 8/1987 | C09D/3/49 |
| EP | 0 260 447 A2 | 8/1987 | C08F/283/10 |
| EP | 0 276 501 A2 | 9/1987 | C11D/1/42 |
| EP | 0 320 552 A1 | 12/1987 | B05D/7/16 |
| EP | 0 299 148 A2 | 4/1988 | C08G/18/08 |
| EP | 0 297 576 A1 | 6/1988 | C09D/3/72 |
| EP | 0 354 261 A1 | 8/1988 | |
| EP | 0 358 153 B1 | 9/1989 | C09D/143/04 |
| EP | 365027 | 4/1990 | |
| EP | 0 394 737 A1 | 4/1990 | C09D/175/06 |
| EP | 0 401 565 A1 | 5/1990 | C09D/5/02 |
| EP | 0 424 705 A2 | 10/1990 | C08F/283/00 |
| EP | 0 521 928 B1 | 3/1991 | C08F/299/06 |
| EP | 450625 | 10/1991 | |
| EP | 0 574 417 B1 | 2/1992 | B05D/5/06 |
| EP | 0 522 419 A1 | 6/1992 | C08G/18/67 |
| EP | 0 522 420 A2 | 6/1992 | C08J/3/03 |
| EP | 0 523 610 | 7/1992 | C09D/163/00 |
| EP | 0 536 712 A2 | 10/1992 | C09D/201/02 |
| EP | 0 540 884 A1 | 10/1992 | B05D/3/06 |
| EP | 0 649 865 A1 | 10/1992 | C08G/18/67 |
| EP | 0 554 783 A1 | 1/1993 | B01J/19/18 |
| EP | 0 568 967 A2 | 5/1993 | B05D/3/00 |
| EP | 0 581 211 A1 | 7/1993 | C08G/18/08 |
| EP | 0 584 818 B1 | 8/1993 | C08G/18/08 |
| EP | 0 590 484 A1 | 9/1993 | C08G/18/08 |
| EP | 0 594 068 A1 | 10/1993 | C09D/201/02 |
| EP | 0 594 071 A1 | 10/1993 | C09D/201/02 |
| EP | 0 594 142 A1 | 10/1993 | C08L/57/12 |
| EP | 0 596 460 A2 | 11/1993 | C09D/201/00 |
| EP | 0 596 461 A2 | 11/1993 | C09D/201/00 |
| EP | 0 708 788 B1 | 6/1994 | C08G/18/08 |
| EP | 0 634 431 A1 | 7/1994 | C08G/18/12 |
| EP | 0 669 356 A1 | 2/1995 | C08G/18/83 |
| EP | 0 678 536 A1 | 4/1995 | C08G/18/08 |
| GB | 2 012 191 A | 12/1978 | |
| WO | WO 82/02387 | 7/1982 | C08F/2/02 |
| WO | WO90/01041 | 2/1990 | C08G/18/08 |
| WO | WO 91/13923 | 9/1991 | C08G/18/08 |
| WO | WO 91/14514 | 10/1991 | B05D/7/26 |
| WO | WO 92/17546 | 10/1992 | C08L/75/04 |
| WO | WO 92/22615 | 12/1992 | C09D/151/08 |
| WO | WO 94/10211 | 5/1994 | C08F/8/30 |
| WO | WO 94/10212 | 5/1994 | C08F/8/30 |
| WO | WO 94/10213 | 5/1994 | C08F/8/30 |
| WO | WO 94/22968 | 10/1994 | C09D/133/06 |
| WO | WO 94/22969 | 10/1994 | C09D/133/06 |
| WO | WO 95/14721 | 6/1995 | C08F/290/14 |
| WO | WO 95/27742 | 10/1995 | C08F/18/04 |
| WO | WO 96/12747 | 5/1996 | C08F/285/00 |
| WO | WO 97/12945 | 4/1997 | C09D/5/04 |
| WO | WO 97/49745 | 12/1997 | C08G/18/08 |
| WO | WO 97/49747 | 12/1997 | C08G/18/75 |

OTHER PUBLICATIONS

English Language Abstract for DE3836815 from EPO, Jul. 26, 1990.

English Language Abstract for EP365027 from EPO, Apr. 25, 1990.

English Language Abstract for EP450625 from EPO, Oct. 09, 1991.

Chemical Abstracts, vol. 84, No. 18, May 3, 1976, Columbus, Ohio; abstract No. 123526w, p. 94;XP002153878; abstract for JP50095388 (Toa Gosei Chem Ind Co., Ltd) Jul. 29, 1975.

U.S. Appl. No. 09/914,545, filed Aug. 30, 2001, Betz et al., previously published as WO00/53687.

U.S. Appl. No. 10/049,532, filed Feb. 12, 2002, Armbrust et al., previously published as WO01/16241.

English language abstract is provided wit the International Publication WO91/13923.

English language abstract is provided wit the International Publication WO90/01041.

Bruce M. Novak, entitled "Hybrid nanocomposite Materials—between inorganic glasses and organic polymers," 1993, pp. 422–433.

Entitled Progress in Organic Coatings, Nov. 22, 1993.

English language abstract is provided wit the International Publication WO94/22969.

English language is provided wit the International Publication WO95/14721.

English language abstract is provided wit the International Publication WO 92/22615.

English language abstract is provided wit the International Publication WO91/14514.
English language abstract is provided wit the International Publication WO99/50359.
English language abstract is provided wit the International Publication WO94/22968.
English language abstract is provided wit the International Publication WO96/12747.
English language abstract for DE 4328092.
English Language Abstract for EP0708788.
English Language Abstract for EP0523610.
English Language Abstract for DE19618657.
English Language Abstract for DE19912661.
English Language Abstract for DE3903804.
English Language Abstract for DE4421823.
English Language Abstract for DE19709465.
English Language Abstract for EP0540884.
English Language Abstract for DE4303570.
English Language Abstract for DE4011045.
English Language Abstract for DE4020316.
English Language Abstract for DE3828098.
English Language Abstract for DE4025215.
English Language Abstract for DE4122743.
English Language Abstract for EP0604922.
English Language Abstract for EP0584818.
English Language Abstract for EP0008127.
English Language Abstract for EP0596461.
English Language Abstract for EP0522420.
English Language Abstract for EP0596460.
English Language Abstract for EP0069936.
English Language Abstract for EP0297576.
English Language Abstract for EP0708788.

* cited by examiner

SOL-GEL COATING FOR SINGLE-LAYER OR MULTI-LAYER VARNISHES

The present invention relates to a novel sol-gel coating material for producing sol-gel coatings on single-coat or multicoat paint systems. The present invention particularly relates to a novel process for producing painted substrates, especially painted automobile bodies, in which the substrates are first provided with a multicoat paint system to which a sol-gel coating material is then applied and cured.

Automobile bodies are provided extensively with a multicoat color and/or effect paint system. Clearcoats are frequently applied as the final coat. Materials suitable for this purpose are the customary and known two-component (2K) or multicomponent (3K, 4K) clearcoat materials.

Two-component (2K) or multicomponent (3K, 4K) clearcoat materials are known to include as their key constituents binders having functional groups which are able to react with isocyanate groups and polyisocyanate cross-linking agents containing free isocyanate groups. The two key constituents are stored separately until their use. Both aqueous and conventional two component (2K) or multi-component (3K, 4K) clearcoat materials are known. An example of an aqueous system is disclosed by the German patent DE-A-44 21 823. These clearcoat materials give weathering-stable coatings which, however, are often not sufficiently scratch-resistant under severe stress. Scratches are particularly visually disruptive even when the clearcoat surface is merely deformed, without any material being removed.

The automobile bodies, especially those for commercial vehicles, may, however, also have single-coat color and/or effect paint systems, which are referred to as solid-color topcoats. Both one-component (1K) and two-component (2K) solid-color topcoat materials are employed. As is known, the one-component (1K) solid-color topcoat materials comprise self-crosslinking or externally crosslinking binders and, for example, amino resin or blocked polyisocyanate crosslinking agents. The two-component (2K) solid-color topcoat materials contain binders with functional groups that are able to react with isocyanate groups, and polyisocyanate cross-linking agents containing free isocyanate groups. Coating materials of this kind are also used as automotive refinish materials. As with the two-component (2K) clearcoat materials, their two essential components are stored separately from one another before use. Solid-color topcoats have a scratch resistance which in some cases fails to satisfy the particularly severe stress to which commercial vehicles are often exposed. More recently, materials known as sol-gel clearcoats and based on siloxane-containing coating formulations have been developed which are obtained by hydrolysis and condensation of silane compounds. These coating materials, which are used as coating compositions on plastics, are described, for example, in the German patents DE-A-43 03 570, 34 07 087, 40 11 045, 40 25 215, 38 28 098, 40 20 316, and 41 22 743.

Sol-gel clearcoats impart very good scratch resistance to substrates made of plastic, such as spectacle lenses or motorcycle helmet visors, for example. This scratch resistance is not achieved by the known OEM (original equipment manufacturing) clearcoat materials normally used for the original finishing of vehicles. The automobile industry is now demanding that this improved scratch resistance be transferred to the clearcoats and solid-color topcoats used in the finishing of automobiles, as well.

Replacing the OEM clearcoat materials commonly used in automotive finishing by sol-gel clearcoat materials, however, is not immediately possible, since the clearcoats are too brittle for this purpose, for example, or because the optical properties (appearance) achieved during the attempt to adapt them to the OEM requirements are in many cases poor. In particular, the sol-gel clearcoat materials are too expensive. The economically more favorable use of the sol-gel clearcoat materials as an additional coat over the clearcoats or solid-color topcoats used to date gives rise to adhesion problems between these paint systems and the sol-gel coat, these problems arising in particular after stone chipping and on exposure to condensation.

It is an object of the present invention to provide a novel sol-gel coating material which permits combination of the advantageous properties of the sol-gel coatings and the advantageous properties of the known single-coat or multicoat paint systems, especially the single-coat or multicoat color and/or effect paint systems for automotive OEM finishing, without any adhesion problems.

The invention accordingly provides the novel sol-gel coating material comprising
(A) an acrylate copolymer solution comprising at least one acrylate copolymer (A1) preparable by copolymerizing at least the following monomers:
  a1) at least one (meth)acrylic ester which is substantially free of acid groups,
  a2) at least one ethylenically unsaturated monomer which carries at least one hydroxyl group per molecule and is substantially free of acid groups, and
  a3) at least one ethylenically unsaturated monomer which carries per molecule at least one acid group which can be converted into the corresponding acid anion group;
(B) a stock varnish preparable by hydrolyzing and condensing at least one hydrolyzable silane (B1) of the general formula I $$SiR_4 \qquad (I),$$

in which the variable R has the following definition:
  R=hydrolyzable groups, hydroxy groups and non-hydrolyzable groups, with the proviso that at least one, preferably at least two, hydrolyzable group(s) is or are present; and
(C) an additive solution comprising
  c1) at least one ethylenically unsaturated compound containing at least one epoxide group,
  c2) at least one silane (B1) having at least one nonhydrolyzable group R which contains at least one epoxide group, and
  c3) at least one adduct of at least one silane (B1) having at least one nonhydrolyzable group R which contains at least one amino group and at least one cyclic ethylenically unsaturated dicarboxylic anhydride.

In the text below, the novel sol-gel coating material is referred to as the "coating material of the invention".

The invention further provides the novel process for producing sol-gel coatings by applying and curing sol-gel coating materials to primed or unprimed substrates or unprimed or primed substrates which have been provided with a single-coat or multicoat paint system, in which process the coating material of the invention is used and/or in which, prior to the application of a sol-gel coating material,
(i1) a single-coat paint system based on a one-component (1K) clearcoat material, two-component (2K) or multi-component (3K, 4K) clearcoat material, powder clearcoat material or UV-curable clearcoat material, (i2) a multicoat color and/or effect paint system with a topmost coat based on a one-component (1K) clearcoat material, two-component (2K) or multi-component (3K, 4K) clearcoat material, powder clearcoat material or UV-curable clearcoat material, or (i3) a single-coat color and/or effect paint system based on a solid-color topcoat material is applied and partly cured.

In the following, the novel processes for producing sol-gel coatings are referred to collectively, for the sake of brevity, as the "process of the invention".

The invention additionally provides novel sol-gel coatings which can be produced from the coating materials of the invention and which are referred to below as "sol-gel coatings of the invention".

The invention provides not least novel substrates which have at least one sol-gel coating of the invention and are referred to below as "substrates of the invention".

In the light of the prior art it was surprising and unforeseeable for the skilled worker that the object on which the invention is based could be achieved by means of the coating material of the invention and process of the invention. A particular surprise was that the coating material of the invention adheres without problems to the paint systems without instances of delamination or cracking on stone chipping or following exposure to condensation, i.e., ten-day exposure of the coats in an atmosphere of 40° C. and 100% relative atmospheric humidity. Additionally, the optical properties of the paint systems provided with the sol-gel coatings of the invention meet all requirements.

The coating material of the invention comprises a siloxane-containing coating formulation which can be prepared by reacting hydrolyzable silicon compounds with water or water donors and which comprises organic constituents in order to improve certain properties. A general description of such systems is given, for example, in the article by Bruce M. Novak, "Hybrid Nanocomposite Materials—Between Inorganic Glasses and Organic Polymers", in Advanced Materials, 1993, 5, No. 6, pp. 422–433, or in the presentation by R. Kasemann, H. Schmidt, 15th International Conference, International Centre for Coatings Technology, Paper 7, "Coatings for mechanical and chemical protection based on organic-inorganic sol-gel nanocomposites", 1993.

The base reactions take place in a sol-gel process in which tetraorthosilicates are hydrolyzed and condensed in the presence or absence of a cosolvent:

Hydrolysis:
$Si(OR)_4 + H_2O \rightarrow (RO)_3Si\text{—}OH + ROH$

Condensation:
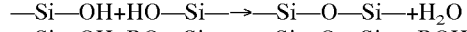
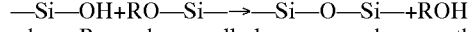
—Si—OH+HO—Si—→—Si—O—Si—+H$_2$O
—Si—OH+RO—Si—→—Si—O—Si—+ROH where R can be an alkyl group, such as methyl or ethyl. Frequently, tetramethyl orthosilicate (TMOS) or tetraethyl orthosilicate (TEOS) are used. To catalyze the reactions, acids, bases or fluoride ions are used.

The coating material of the invention thus comprises siloxane-containing structures modified with organic constituents (Ormocer®=organically modified ceramic).

By means of controlled hydrolysis and condensation of silicic esters and of metal alkoxides, the sol-gel coating of the invention is prepared. It acquires specific properties through the incorporation of organically modified silicic acid derivatives into the silicatic network. They permit the construction of an organic polymer network in addition to the inorganic framework, if organic radicals, preferably those containing olefinically unsaturated groups and/or epoxide groups, are used.

Modification is inventively effected as a result of the presence of a ready-made organic polymer during the hydrolysis and condensation of the starting materials or in the sol.

The coating material of the invention consists of the three essential components (A), (B) and (C).

Component (A) comprises an acrylate copolymer solution which is preferably free of aromatic solvents.

In the context of the present invention, the term "free of aromatic solvents" or "aromatics-free", here and below, means that the amount of aromatic solvents or aromatic compounds in a solution is <1% by weight, preferably <0.5% by weight, and with particular preference <0.2% by weight, and in particular lies below the gas-chromatographic detection limit.

The acrylate copolymer solution (A) for inventive use comprises at least one acrylate copolymer (A1) prepared by copolymerizing the following monomers (a1), (a2) and (a3) and also, if desired, further monomers (a4), (a5) and/or (a6), the nature and amount of (a1), (a2) and (a3) and also, if used, (a4), (a5) and (a6) being selected such that the acrylate copolymer (A1) has the desired OH number and acid number and the desired molecular weight. Preferably, the acrylate copolymers (A1) have a hydroxyl number of from 40 to 240, with particular preference from 60 to 210, and in particular from 100 to 200, an acid number of from 5 to 100, with particular preference from 10 to 60, and in particular from 20 to 40, glass transition temperatures of from −35 to +85° C., and number-average molecular weights Mn of from 1 500 to 300 000.

The polyacrylate resins used inventively may be prepared using as monomer (a1) any (meth)acrylic acid alkyl or cycloalkyl ester which is copolymerizable with (a2), (a3), (a4), (a5) and (a6) and has up to 20 carbon atoms in the alkyl radical, especially methyl, ethyl, propyl, n-butyl, sec-butyl, tert-butyl, hexyl, ethyl-hexyl, stearyl and lauryl acrylate or methacrylate; cycloaliphatic (meth)acrylates, especially cyclohexyl, isobornyl, dicyclopentadienyl, octahydro-4,7-methano-1H-indenemethanol or tert-butylcyclohexyl (meth)-acrylate; (meth)acrylic oxaalkyl or oxacycloalkyl esters such as ethyltriglycol (meth)acrylate and methoxyoligo-glycol (meth)acrylate having a molecular weight Mn of preferably 550; or other ethoxylated and/or propoxy-lated, hydroxyl-free (meth)acrylic acid derivatives. These monomers may include, in minor amounts, more highly functional (meth)acrylic alkyl or cycloalkyl esters such as ethylene glycol, propylene glycol, diethylene glycol, dipropylene glycol, butylene glycol, 1,5-pentanediol, 1,6-hexanediol, octahydro-4,7-methano-1H-indenedimethanol or 1,2-, 1,3- or 1,4-cyclohexanediol di(meth)acrylate; trimethylolpropane di- or tri(meth)-acrylate; or pentaerythritol di-, tri- or tetra(meth)-acrylate. In the context of the present invention, minor amounts of higher-functional monomers are those amounts that do not lead to crosslinking or gelling of the polyacrylate resins.

As monomers (a2) it is possible to use any ethylenically unsaturated monomers which are copolymerizable with (a1), (a2), (a3), (a4), (a5) and (a6) and different from (a5), carry at least one hydroxyl group per molecule and are essentially free from acid groups, such as hydroxyalkyl esters of acrylic acid, methacrylic acid or another alpha,beta-ethylenically unsaturated carboxylic acid which are derived from an alkylene glycol which is esterified with the acid or are obtainable by reacting the acid with an alkylene oxide; especially hydroxyalkyl esters of acrylic acid, meth-acrylic acid, ethacrylic acid, crotonic acid, maleic acid, fumaric acid or itaconic acid, in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate, crotonate, maleate, fumarate or itaconate; 1,4-bis (hydroxymethyl)cyclohexane, octahydro-4,7-methano-1H-indenedimethanol or methylpropanediol monoacrylate, monomethacrylate, monoethacrylate, monocrotonate, mono-maleate, monofumarate or monoitaconate; or reaction products of cyclic esters, such as epsilon-caprolactone, for example, and these hydroxyalkyl esters; or olefinically unsaturated alcohols such as allyl alcohol or polyols such as trimethylolpropane monoallyl or diallyl ether or pentaerythritol monoallyl, diallyl or triallyl ether. As far as these higher-functional monomers (a2) are concerned, the comments made for the higher-functional monomers (a1) apply analogously. The proportion of trimethylolpropane monoallyl ether is usually from 2 to 10% by weight, based on the overall weight of the monomers (a1) to (a6) used to prepare the polyacrylate resin. In addition, however, it is also possible to add from 2 to 10% by weight, based on the overall weight of the monomers used to prepare the polyacrylate resin, of trimethylolpropane monoallyl ether to the finished polyacrylate resin. The olefinically unsaturated polyols, such as trimethylolpropane monoallyl ether in particular, may be used as sole hydroxyl-containing monomers, but in particular may be used proportionately in combination with other of the abovementioned hydroxyl-containing monomers.

As the monomer (a3) it is possible to use any ethylenically unsaturated monomer, or mixture of such monomers, which carries at least one acid group, preferably one carboxyl group, per molecule and is copolymerizable with (a1), (a2), (a4), (a5) and (a6). As component (a3) it is particularly preferred to use acrylic acid and/or methacrylic acid. However, other ethylenically unsaturated carboxylic acids having up to 6 carbon atoms in the molecule may also be used. Examples of such acids are ethacrylic acid, crotonic acid, maleic acid, fumaric acid, and itaconic acid. It is further possible to use ethylenically unsaturated sulfonic or phosphonic acids, and/or their partial esters, as component (a3). Further suitable components (a3) include mono(meth) acryloyloxyethyl maleate, succinate and phthalate.

As monomers (a4) it is possible to use one or more vinyl esters of alpha-branched monocarboxylic acids having 5 to 18 carbon atoms in the molecule. The branched monocarboxylic acids may be obtained by reacting formic acid or carbon monoxide and water with olefins in the presence of a liquid, strongly acidic catalyst; the olefins may be cracking products of paraffinic hydrocarbons, such as mineral oil fractions, and may comprise branched and straight-chain acyclic and/or cycloaliphatic olefins. The reaction of such olefins with formic acid or with carbon monoxide and water produces a mixture of carboxylic acids in which the carboxyl groups are located predominantly on a quaternary carbon atom. Other olefinic starting materials are, for example, propylene trimer, propylene tetramer and diisobutylene. Alternatively, the vinyl esters may be prepared in a conventional manner from the acids; for example, by reacting the acid with acetylene. Particular preference, owing to their ready availability, is given to the use of vinyl esters of saturated aliphatic monocarboxylic acids having 9 to 11 carbon atoms which are branched on the alpha carbon atom.

As the monomer (a5), use is made of the reaction product of acrylic acid and/or methacrylic acid with the glycidyl ester of an alpha-branched monocarboxylic acid having 5 to 18 carbon atoms per molecule. Glycidyl esters of highly branched monocarboxylic acids are available under the trade name "Cardura". The reaction of the acrylic or methacrylic acid with the glycidyl ester of a carboxylic acid having a tertiary alpha carbon atom can take place before, during or after the polymerization reaction. As the component (a5) it is preferred to use the reaction product of acrylic acid and/or methacrylic acid with the glycidyl ester of Versatic acid. This glycidyl ester is commercially available under the name "Cardura E10".

As monomers (a6) it is possible to use all ethylenically unsaturated monomers, or mixtures of such monomers, which are copolymerizable with (a1), (a2), (a3), (a4) and (a5), are different from (a1), (a2), (a3) and (a4), and are substantially free from acid groups. Suitable components (a6) include the following:

olefins such as ethylene, propylene, 1-butene, 1-pentene, 1-hexene, cyclohexene, cyclopentene, norbornene, butadiene, isoprene, cyclopentadiene and/or dicyclopentadiene;

(meth)acrylamides such as (meth)acrylamide, N-methyl-, N,N-dimethyl-, N-ethyl-, N,N-diethyl-, N-propyl-, N,N-dipropyl-, N-butyl-, N,N-dibutyl-, N-cyclohexyl- and/or N,N-cyclohexyl-methyl-(eth)-acrylamide;

monomers containing epoxide groups, such as the glycidyl ester of acrylic acid, methacrylic acid, ethacrylic acid, crotonic acid, maleic acid, fumaric acid and/or itaconic acid;

vinylaromatic hydrocarbons, such as styrene, alpha-alkylstyrenes, especially alpha-methyl-styrene, and/or vinyltoluene;

nitriles such as acrylonitrile and/or methacrylo-nitrile;

vinyl compounds such as vinyl chloride, vinyl fluoride, vinylidene dichloride, vinylidene difluoride; N-vinylpyrrolidone; vinyl ethers such as ethyl vinyl ether, n-propyl vinyl ether, isopropyl vinyl ether, n-butyl vinyl ether, isobutyl vinyl ether and/or vinyl cyclohexyl ether; vinyl esters such as vinyl acetate, vinyl propionate, vinyl butyrate, vinyl pivalate and/or the vinyl ester of 2-methyl-2-ethylheptanoic acid; and/or polysiloxane macromonomers having a number-average molecular weight Mn of from 1 000 to 40 000, preferably from 2 000 to 20 000, with particular preference from 2 500 to 10 000 and in particular from 3 000 to 7 000 and having on average from 0.5 to 2.5, preferably from 0.5 to 1.5, ethylenically unsaturated double bonds per molecule, as described in DE-A-38 07 571 on pages 5 to 7, in DE-A-37 06 095 in columns 3 to 7, in EP-B-0 358 153 on pages 3 to 6, in U.S. Pat. No. 4,754,014 in columns 5 to 9, in DE-A-44 21 823 or in the international patent application WO 92/22615 on page 12, line 18 to page 18, line 10, or acryloxysilane-containing vinyl monomers, preparable by reacting hydroxy-functional silanes with epichlorohydrin and subsequently reacting the reaction product with methacrylic acid and/or hydroxyalkyl esters of (meth)acrylic acid.

Preference is given to using vinylaromatic hydro-carbons, especially styrene.

The nature and amount of the components (a1) to (a6) is selected such that the polyacrylate resin (A1) has the desired OH number, acid number, and glass transition temperature. Acrylate resins used with particular preference are obtained by polymerizing (a1) from 20 to 60% by weight, preferably from 30 to 50% by weight, of the component (a1), (a2) from 10 to 50% by weight, preferably from 15 to 40% b y weight, of the component (a2), (a3) from 1 to 15% by weight, preferably from 1 to 8% by weigh t, of the component (a3), (a4) from 0 to 25% by weight of the component (a4), (a5) from 0 to 25% by weight of the component (a5), and (a6) from 5 to 30% by weight, preferably from 10 to 20% by weight, of the component (a6), the sum of the weight fractions of the components (a1) to (a6) being 100% in each case.

The inventively employed acrylate copolymers (A1) are prepared in an organic solvent or solvent mixture, which is preferably free from aromatic solvents, and in the presence of at least one polymerization initiator. Polymerization initiators used are the polymerization initiators which are customary for the preparation of acrylate copolymers.

Examples of suitable polymerization initiators are initiators which form free radicals, such as, for example, tert-butyl peroxyethylhexanoate, benzoyl peroxide, di-tert-amyl peroxide, azobisisobutyro-nitrile, and tert-butyl perbenzoate. The initiators are used preferably in an amount of from 1 to 25% by weight, with particular preference from 2 to 10% by weight, based on the overall weight of the monomers.

The polymerization is appropriately conducted at a temperature of from 80 to 200° C., preferably from 110 to 180° C.

Preferred solvents used are ethoxyethyl propionate and isopropoxypropanol.

The acrylate copolymer (A1) is preferably prepared by a two-stage process, since in this way the resulting coating materials of the invention have improved processing properties. Preference is therefore given to using acrylate copolymers (A1) which are obtainable by 1. polymerizing a mixture of the monomers (a1) and (a2) and, if desired, (a4), (a5) and/or (a6), or a mixture of portions of the monomers (a1) and (a2) and also, if desired, (a4), (a5) and/or (a6), in an organic solvent, and 2. after at least 60% by weight of the mixture of (a1) and (a2) and, if desired, (a4), (a5) and/or (a6) have been added, adding the monomer (a3) and any remainder of the monomers (a1) and (a2) and, if appropriate, (a4), (a5) and/or (a6), and continuing polymerization.

In addition, however, it is also possible to include the monomers (a4) and/or (a5) in the initial charge, together with at least some of the solvent, and to meter in the remaining monomers. Furthermore, it is also possible for only some of the monomers (a4) and/or (a5) to be included in the initial charge, together with at least some of the solvent, and for the remainder of these monomers to be added as described above. Preferably, for example, at least 20% by weight of the solvent and about 10% by weight of the monomers (a4) and (a5), and, if desired, portions of the monomers (a1) and (a6), are included in the initial charge.

Preference is further given to preparing the inventively employed acrylic polymers (A1) by a two-stage process in which the first stage lasts for from 1 to 8 hours, preferably from 1.5 to 4 hours, and the mixture of (a3) and any remainder of the monomers (a1), (a2) and, if appropriate, (a4), (a5) and (a6) is added over the course of from 20 to 120 minutes, preferably over the course of from 30 to 90 minutes. Following the end of the addition of the mixture of (a3) and any remainder of the monomers (a1) and (a2) and, if appropriate, (a4), (a5) and (a6), polymerization is continued until all of the monomers used have undergone substantially complete reaction. In this case, the second stage may follow on immediately from the first. Alternatively, the second stage may be commenced only after a certain time, for example, after from 10 minutes to 10 hours.

The amount, and rate of addition, of the initiator is preferably chosen so as to give an acrylate copolymer (A1) having a number-average molecular weight Mn of from 1 000 to 30 000 daltons. It is preferred to commence the addition of initiator some time, generally from about 1 to 15 minutes, before the addition of the monomers. Furthermore, preference is given to a process in which the addition of initiator is commenced at the same point in time as the addition of the monomers and ended about half an hour after the addition of the monomers. The initiator is preferably added in a constant amount per unit time. Following the end of the addition of initiator, the reaction mixture is held at polymerization temperature until (generally 1.5 hours) all of the monomers used have undergone substantially complete reaction. "Substantially complete reaction" is intended to denote that preferably 100% by weight of the monomers used have been reacted but that it is also possible for a small residual monomer content of not more than up to about 0.5% by weight, based on the weight of the reaction mixture, to remain unreacted.

Preferably, the monomers for preparing the acrylate copolymers (A1) are polymerized with not too high a polymerization solid, preferably with a polymerization solid of from 80 to 50% by weight, based on the monomers, and then the solvents are partially removed by distillation, so that the resulting acrylate copolymer solutions (A) have a solids content of preferably from 100 to 60% by weight.

For use in the inventive coating material, the solids content of the acrylate copolymer solutions (A) is adjusted with at least one preferably aromatic-free solvent preferably to less than 60% by weight, particularly preferably less than 40% by weight, and in particular less than 30% by weight.

Example of suitable solvents are ethoxyethyl propionate and butyl glycol.

The preparation of the acrylate copolymers (A1) for inventive use has no special features in terms of method but instead takes place with the aid of the methods which are customary and known in the field of polymers for continuous or batchwise copolymerization under atmospheric or superatmospheric pressure in stirred tanks, autoclaves, tube reactors or Taylor reactors.

Examples of suitable copolymerization processes are described in the patents DE-A-197 09 465, DE-C-197 09 476, DE-A-28 48 906, DE-A-195 24 182, EP-A-0 554 783, WO 95/27742 or WO 82/02387.

In accordance with the invention, Taylor reactors are advantageous.

Taylor reactors, which serve to convert substances under the conditions of Taylor vortex flow, are known. They consist essentially of two coaxial concentric cylinders of which the outer is fixed while the inner rotates. The reaction space is the volume formed by the gap between the cylinders. Increasing angular velocity $\omega_i$ of the inner cylinder is accompanied by a series of different flow patterns which are characterized by a dimensionless parameter, known as the Taylor number Ta. As well as the angular velocity of the stirrer, the Taylor number is also dependent on the kinematic viscosity $\nu$ of the fluid in the gap and on the geometric parameters, the external radius of the inner cylinder $r_i$, the internal radius of the outer cylinder $r_0$ and the gap width d, the difference between the two radii, in accordance with the following formula:

$$Ta = \omega_i r_i d \nu^{-1} (d/r_i)^{1/2} \quad \text{(I)}$$

where $d = r_o - r_i$.

At low angular velocity, the laminar Couette flow, a simple shear flow, develops. If the rotary speed of the inner cylinder is increased further, then, above a critical level, alternately contrarotating vortices (rotating in opposition) occur, with axes along the peripheral direction. These vortices, called Taylor vortices, are rotationally symmetric and have a diameter which is approximately the same size as the gap width. Two adjacent vortices form a vortex pair or a vortex cell.

The basis of this behavior is the fact that, in the course of rotation of the inner cylinder with the outer cylinder at rest, the fluid particles that are near to the inner cylinder are subject to a greater centrifugal force than those at a greater distance from the inner cylinder. This difference in the acting centrifugal forces displaces the fluid particles from the inner to the outer cylinder. The centrifugal force acts counter to the viscosity force, since for the motion of the fluid particles it is necessary to overcome the friction. If there is an increase in the rotary speed, there is also an increase in the centrifugal force. The Taylor vortices are formed when the centrifugal force exceeds the stabilizing viscosity force.

In the case of Taylor flow with a low axial flow, each vortex pair passes through the gap, with only a low level of mass transfer between adjacent vortex pairs. Mixing within such vortex pairs is very high, whereas axial mixing beyond the pair boundaries is very low. A vortex pair may therefore be regarded as a stirred tank in which there is thorough mixing. Consequently, the flow system behaves as an ideal flow tube in that the vortex pairs pass through the gap with constant residence time, like ideal stirred tanks.

Of advantage in accordance with the invention here are Taylor reactors having an external reactor wall located within which there is a concentrically or eccentrically disposed rotor, a reactor floor and a reactor lid, which together define the annular reactor volume, at least one means for metered addition of reactants, and a means for the discharge of product, where the reactor wall and/or the rotor are or is geometrically designed in such a way that the conditions for Taylor vortex flow are met over substantially the entire reactor length in the reactor volume, i.e. in such a way that the annular gap broadens in the direction of flow traversal.

The proportion of the constituent (A) in the coating material of the invention may vary very widely and is guided in particular by the intended flexibility of the inventive sol-gel coating produced therefrom. There is an upper limit on the proportion; thus, it may not be chosen so high that phase separation occurs in the coating material of the invention, or the hardness and scratch resistance of the sol-gel coating decrease too sharply. The skilled worker is therefore able to determine the proportion which is optimal in each case, on the basis of his or her knowledge in the art, with or without the assistance of simple preliminary tests.

The further essential constituent of the coating material of the invention is the stock varnish (B). It too is preferably free of aromatic solvents.

It is prepared by controlled hydrolysis and condensation of at least one organically modified hydrolyzable silane (B1). In accordance with the invention it is of advantage to use at least two silanes (B1).

The hydrolyzable silane (B1) comprises compounds of the general formula I $$SiR_4 \qquad (I)$$

in which the radicals R may be identical or different and are selected from hydrolyzable groups, hydroxyl groups, and nonhydrolyzable groups.

The nonhydrolyzable groups R in the general formula (I) are preferably selected from alkyl groups, having in particular 1 to 4 carbon atoms, such as methyl, ethyl, propyl and butyl groups; alkenyl groups, having in particular 2 to 4 carbon atoms, such as vinyl, 1-propenyl, 2-propenyl and butenyl groups; alkynyl groups, having in particular 2 to 4 carbon atoms, such as acetylenyl and propargyl groups; and aryl groups, having in particular 6 to 10 carbon atoms, such as phenyl and naphthyl groups, for example. Nonhydrolyzable groups R used are preferably alkyl groups. Examples of hydrolyzable groups R in the above formula I are hydrogen atoms; alkoxy groups, having in particular 1 to 20 carbon atoms, such as methoxy, ethoxy, n-propoxy, i-propoxy, n-butoxy, tert-butoxy and sec-butoxy groups; alkoxy-substituted alkoxy groups, such as beta-methoxyethoxy groups; acyloxy groups, having in particular 1 to 4 carbon atoms, such as acetoxy and propionyloxy groups; and alkylcarbonyl groups such as acetyl groups, for example.

Particularly preferred hydrolyzable groups R are those which carry no substituents and lead to aromatics-free hydrolysis products of low molecular weight, examples being lower alcohols, such as methanol, ethanol, propanol, n-butanol, i-butanol, sec-butanol, and tert-butanol.

At least one group R of the formula I must be a hydrolyzable group. Silanes (B1) having two, preferably and four in particular three hydrolyzable groups R are particularly preferred.

The nonhydrolyzable groups R of the silanes (B1) may include at least one functional group. These functional groups can, for example, be epoxy groups, amino groups, olefinically unsaturated groups such as vinyl or (meth) acrylic groups, mercapto groups, isocyanate groups and/or reaction products thereof with further reactive compounds.

Examples of highly suitable hydrolyzable silanes (B1) for use in accordance with the invention are methyltriethoxysilane, methyltrimethoxysilane, tetramethyl orthosilicate, tetraethyl orthosilicate, 3-glycidyloxypropyl trimethoxysilane, and 3-aminopropyltriethoxysilane.

The silanes (B1) can be used in whole or in part in the form of precondensates, i.e., compounds formed by partial hydrolysis of the silanes (B1), either alone or in a mixture with other hydrolyzable compounds.

For the hydrolysis and condensation, the silanes (B1) are precondensed in the desired proportion with water. The amount of water is metered in in such a way as to avoid local excess concentrations. This is done, for example, by introducing the amount of water into the reaction mixture using moisture-laden adsorbents, e.g., silica gel or molecular sieves, hydrous organic solvents, e.g., 80% ethanol, or salt hydrates, e.g., $CaCl_2 \times 6H_2O$. Precondensation takes place preferably in the presence of a hydrolysis and condensation catalyst but in the absence of an organic solvent.

In another variant, the hydrolysis and condensation of the hydrolyzable silanes (B1) is conducted in the presence of a preferably aromatics-free organic solvent, such as an aliphatic alcohol, such as methanol, ethanol, propanol, isopropanol or butanol, an ether such as dimethoxyethane, an ester such as dimethyl glycol acetate or methoxypropyl acetate, and/or 2-ethoxyethanol (ethyl glycol) or a ketone such as acetone or methyl ethyl ketone.

If desired, metal compounds and/or metal oxides in the form of nanoparticles may also be present during the hydrolysis and condensation.

These nanoparticles are <50 nm. They may comprise, for example, $Al_2O_3$, $ZrO_2$ and/or $TiO_2$.

Examples of suitable metal compounds are hydrolyzable metal compounds (B2) of the general formula (II)

$$MR_n \qquad (II)$$

In the general formula II, the variable M stands for aluminum, titanium or zirconium, but especially aluminum. Accordingly, the index n stands for 3 or 4.

In the general formula II, the variable R has the same definition as indicated above in connection with the general formula I. It is of advantage here if in the case of aluminum there are at least two, in particular three, and in the case of titanium or zirconium there are three, in particular four, hydrolyzable groups present.

In this context, the above-described alkoxy groups are particularly advantageous and are therefore used with preference. Very particular preference is given to using sec-butyloxy groups. One example of a very particularly preferably used hydrolyzable metal compound (B2) is therefore aluminum tri-sec-butylate.

The molar ratio of metal M to silicon may vary widely and is guided in particular by the target scratch resistance and hardness of the sol-gel coatings of the invention. In general, the scratch resistance of the sol-gel coatings of the invention may be increased by replacing some of the silicon with—in particular—aluminum. In particular, the molar ratio M: Si may be from 1:10 to 10:1.5, preferably from 1:6 to 1:3.

Suitable hydrolysis and condensation catalysts include proton- or hydroxyl-ion-donating compounds and amines. Specific examples are organic or inorganic acids, such as hydrochloric acid, sulfuric acid, phosphoric acid, formic acid or acetic acid, and organic or inorganic bases such as ammonia, alkali metal hydroxides or alkaline earth metal hydroxides, e.g., sodium, potassium or calcium hydroxide, and amines soluble in the reaction medium, examples being lower alkylamines or alkanolamines. Particular preference is given in this context to volatile acids and bases, especially hydrochloric acid, acetic acid, ammonia or triethyl-amine.

The precondensation is continued until the resulting stock varnish (B) still has a liquid consistency. Preferably, it has a solids content of less than 80% by weight, with particular preference less than 60% by weight, and in particular less than 40% by weight.

The fraction of the constituent (B) in the coating material of the invention may also vary very widely and is guided in particular by the target scratch resistance and hardness of the sol-gel coating of the invention which is produced from said coating material. There is an upper limit on the fraction; thus, it may not be chosen so high that there is phase separation in the coating material of the invention and/or that the sol-gel coatings of the invention produced using it become too hard and brittle. The skilled worker will therefore be able to determine the fraction that is optimum in each case, on the basis of his or her knowledge of the art, with or without the assistance of simple preliminary tests.

The third essential constituent of the coating material of the invention is the additive solution (C).

This solution comprises at least one ethylenically unsaturated compound (c1) containing at least one epoxide group. An example of a suitable compound (c1) is glycidyl (meth) acrylate.

It further comprises as component (c2) at least one silane (B1) containing at least one nonhydrolyzable group R which contains at least one epoxide group. An example of a suitable compound (c2) is 3-glycidyloxy-propyltrimethoxysilane.

Not least, it comprises at least one adduct (c3) of at least one silane (B1) containing at least one non-hydrolyzable group R having a t least one amino group, and at least one cyclic, ethylenically unsaturated dicarboxylic anhydride. An example of a suitable silane (B1) is 3-aminopropyltriethoxysilane. Examples of suitable dicarboxylic anhydrides are maleic anhydride and itaconic anhydride.

The additive solution contains the components (c1), (c2) and (c3) in a weight ratio of (1 to 10):(1 to 30):1, in particular (2 to 6):(0 to 20):1. The solids content of the additive solution (C) is preferably below 80% by weight, more preferably below 60% by weight, and in particular below 50% by weight.

The proportion of the additive solution (C) in the coating material of the invention may also vary widely. The skilled worker is able to determine the proportion that is optimal in each case, on the basis of his or her knowledge in the art, with or without the assistance of simple preliminary tests.

Particularly advantageous coating materials of the invention contain, based in each case on their overall amount, from 5 to 20, preferably from 10 to 15, and in particular from 11 to 14% by weight of the acrylate copolymer solution (A), from 40 to 85, preferably from 45 to 80, and in particular from 50 to 75% by weight of the stock varnish (B), and from 0.5 to 3, preferably from 1 to 2, and in particular from 1.2 to 1.7% by weight of the additive solution (C).

It is of very particular advantage in this context, in accordance with the invention, for the solids contents of the constituents (A), (B) and (C) that are essential to the invention to be chosen such that their mutual weight ratio (A): (B): (C) is 1 to 10:30 to 60:1 preferably 2 to 8:35 to 55:1, and especially 2.5 to 6:40 to 50:1.

The coating material of the invention may further comprise at least one curing agent (D). Examples of suitable curing agents (D) are quaternary ammonium compounds such as tetraalkylammonium salts, especially tetramethylammonium iodide. In the coating material of the invention, the curing agent (D) may preferably be present in an amount of from 0.001 to 1% by weight.

The coating material of the invention may further comprise relatively large amounts of preferably non-aromatic solvents as constituent (E). This is particularly the case when particularly thin sol-gel coatings of the invention are to be produced. Examples of suitable solvents (E) are the above-mentioned lower alcohols, especially ethanol, or glycol ethers such as ethyl glycol or butyl glycol.

The coating material of the invention may further comprise customary and known coatings additives (F). Suitable coatings additives (F) are all those which do not adversely effect, but instead advantageously vary and enhance, the profile of properties of the sol-gel coatings of the invention, especially their optical properties (appearance) and scratch resistance.

Examples of suitable coatings additives (F) are light stabilizers such as UV absorbers;

free-radical scavengers;

crosslinking catalysts;

slip additives;

polymerization inhibitors;

defoamers;

emulsifiers, especially nonionic emulsifiers such as alkoxylated alkanols and polyols, phenols and alkylphenols or anionic emulsifiers such as alkali metal salts or ammonium salts of alkanecarboxylic acids, alkanesulfonic acids, and sulfonic acids of alkoxylated alkanols and polyols, phenols and alkylphenols;

wetting agents such as siloxanes, fluorine compounds, carboxylic monoesters, phosphoric esters, polyacrylic acids and their copolymers, or polyurethanes;

adhesion promoters;

leveling agents;

film-forming auxiliaries such as cellulose derivatives;

flame retardants or rheology control additives such as those known from the patents WO 94/22968, EP-A-0 276 501, EP-A-0 249 201 or WO 97/12945; crosslinked polymeric microparticles, such as are disclosed, for example, in EP-A-0 008 127; inorganic phyllo-silicates such as aluminum magnesium silicates, sodium magnesium phyllosilicates and sodium magnesium fluorine lithium phyllosilicates of the montmorillonite type; silicas such as Aerosils; or synthetic polymers containing ionic and/or associative groups such as polyvinyl alcohol, poly(meth)acrylamide, poly(meth)acrylic acid, polyvinylpyrrolidone, styrene-maleic anhydride copolymers or ethylene maleic anhydride copolymers and their derivatives or hydrophobically modified ethoxylated urethanes or polyacrylates.

Further examples of suitable additives (E) are described in the textbook "Lackadditive" [Additives for Coatings] by Johan Bieleman, Wiley-VCH, Weinheim, New York, 1998.

The coating material of the invention has a solids content of up to 80, preferably up to 60, with particular preference up to 40, and in particular up to 20, % by weight. Where particularly thin sol-gel coatings of the invention, i.e., coatings with a thickness <5 μm, are to be produced, it is advisable to choose a solids content of less than 20% by weight.

The preparation of the coating material of the invention has no special features but instead takes place in a customary and known manner by mixing of its essential constituents (A), (B) and (C) and also, where used, (D), (E) and/or (F) in customary and known mixing units such as dissolvers. The constituents here may be mixed with one another in any desired way. For example, they may be introduced all at once into the mixing unit and mixed with one another. In accordance with the invention, however, it is of advantage to introduce the stock varnish (B) initially and then to add the remaining constituents individually in succession. It has been found appropriate here to add the acrylate copolymer solution (A) before the additive solution (C). Where a solvent (E) is used, it is advantageously added following the addition of the acrylate copolymer solution (A) and before the addition of the additive solution (C). Where coatings additives (F) are used, they are added advantageously following the addition of the acrylate copolymer solution (A). The curing agent (D) is advantageously added last.

The coating materials of the invention are outstandingly suitable for the production of the sol-gel coatings of the invention, especially sol-gel clearcoats.

In accordance with the invention, they can be used to coat any conceivable substrate. By way of example, mention may be made of substrates of metal, plastic, glass, wood or ceramic. These substrates may have been provided with a primer. In the case of plastic, the primer in question may be a so-called hydro primer. In the case of metal, the substrate may also have been subjected to a surface treatment, for example a galvanization or phosphation or anodizing. Moreover, the metal substrate may also carry an electrodeposition coating and a primer-surfacer as primer.

The application of the coating materials of the invention has no special features in terms of its method; rather, it is possible to employ the common application methods such as spraying, knifecoating, brushing, flow coating, dipping or rolling.

Following their application, the coating materials of the invention are cured to give the sol-gel coatings of the invention. Curing may be preceded if desired by initial drying. For this as well it is possible to employ the customary and known techniques and apparatus such as forced air ovens. The coating materials of the invention may also be cured with middle-range IR radiation. By this means it is possible to carry out targeted coating and scratchproofing of only parts of substrates or single-coat or multicoat paint systems, at damaged or particularly exposed points, without detriment to the remaining parts as a result of thermal loading. This makes it possible to use the coating materials of the invention advantageously in automotive refinish. Since it is also possible in this context to restrict to a minimum the amount of the coating material of the invention, its use is also particularly economical.

The coating materials of the invention may be applied directly to the abovementioned primed or unprimed substrates in order to form thereon, after curing, a scratch-proof sol-gel coating of the invention. In this way it is possible to scratchproof substrates such as are commonly used for the production of vehicles, of other components and equipment, such as radiators or containers, or of furniture.

The particular advantages of the coating materials of the invention are manifested to a particular extent, however, if they are used for the coating of single-coat or multicoat paint systems with the sol-gel coatings of the invention.

Accordingly, the coating materials of the invention are suitable for coating single-coat or multicoat paint systems, especially single-coat or multicoat color and/or effect paint systems such as are customary and known in the fields of automotive OEM finishing, automotive refinish, industrial coating, including container coatings, the coating of plastics, and furniture coating.

Examples of single-coat paint systems of this kind are the solid-color topcoats described at the outset and known from automotive OEM finishing and automotive refinish, especially those based on the two-component (2K) solid-color topcoat materials, or clear, transparent paint systems based on the clearcoat materials described below, especially the one-component (1K) clearcoat materials, the two-component (2K) or multicomponent (3K, 4K) clearcoat materials, the powder clearcoat materials and the UV-curable clearcoat materials.

Examples of multicoat paint systems are the paint systems which comprise an effect and/or color basecoat, especially one based on an aqueous basecoat material, and a clearcoat, particularly one based on a one-component (1K) clearcoat material, two-component (2K) or multicomponent (3K, 4K) clearcoat material, powder clearcoat material, powder slurry clearcoat material or UV-curable clearcoat material, in particular a two-component (2K) or multicomponent (3K, 4K) clearcoat material, and which are produced in the context of automotive OEM finishing by the wet-on-wet technique or in the context of automotive refinish.

The coating materials of the invention are particularly outstandingly suitable for coating multicoat paint systems of this kind in particular.

Examples of suitable aqueous basecoat materials and of the corresponding multicoat paint systems are known from the patents EP-A-0 089 497, EP-A-0 256 540, EP-A-0 260 447, EP-A-0 297 576, WO 96/12747, EP-A-0 523 610, EP-A-0 228 003, EP-A-0 397 806, EP-A-0 574 417, EP-A-0 574 510, EP-A-0 581 211, EP-A-0 708 788, EP-A-0 593 454, DE-A-43 28 092, EP-A-0 299 148, EP-A-0 394 737, EP-A-0 590 484, EP-A-0 234 362, EP-A-0 234 361, EP-A-0 543 817, WO 95/14721, EP-A-0 521 928, EP-A-0 522 420, EP-A-0 522 419, EP-A-0 649 865, EP-A-0 536 712, EP-A-0 596 460, EP-A-0 596 461, EP-A-0 584 818, EP-A-0 669

356, EP-A-0 634 431, EP-A-0 678 536, EP-A-0 354 261, EP-A-0 424 705, WO 97/49745, WO 97/49747 or EP-A-0 401 565.

When two-component (2K) solid-color topcoat materials or one-component (1K) clearcoat materials, two-component (2K) or multicomponent (3K, 4K) clearcoat materials, powder clearcoat materials and UV-curable clearcoat materials, especially two-component (2K) or multicomponent (3K, 4K) clearcoat materials, are used to produce single-coat or multicoat paint systems, there is the further key advantage that the sol-gel coatings can be suitably produced using not only the coating materials of the invention but also conventional sol-gel clearcoat materials, if the said coating materials are partly cured following their application and before the application of the sol-gel clearcoat materials. After this, the said coating materials are cured completely together with the sol-gel clearcoat materials. This inventive procedure results in particularly good adhesion between the coating films and the sol-gel coatings. Particularly outstanding results are obtained if the coating materials of the invention are used in the process of the invention.

Examples of suitable one-component (1K), two-component (2K) or multicomponent (3K, 4K) clearcoat materials are known, for example, from the patents DE-A-42 04 518, U.S. Pat. No. 5,474,811, U.S. Pat. No. 5,356,669, U.S. Pat. No. 5,605,965, WO 94/10211, WO 95/10212, WO 94/10213, EP-A-0 594 068, EP-A-0 594 071, EP-A-0 594 142, EP-A-0 604 992, WO 94/22969, EP-A-0 596 460 or WO 92/22615.

One-component (1K) clearcoat materials comprise, as is known, hydroxyl-containing binders and crosslinking agents such as blocked polyisocyanates, tris(alkoxycarbonylamino)triazines and/or amino resins. In a further variant, they comprise as binders polymers containing pendant carbamate and/or allophanate groups and, if desired, carbamate- and/or allophanate-modified amino resins as crosslinking agents.

Two-component (2K) or multicomponent (3K, 4K) clearcoat materials contain, as is known, the essential constituents hydroxyl-containing binders and polyisocyanate crosslinking agents, these constituents being stored separately until such time as they are used.

Examples of suitable powder clearcoat materials are known, for example, from the German patent DE-A-42 22 194 or the BASF Lacke+Farben AG product information bulletin "Pulverlacke" [Powder coating materials], 1990.

Powder clearcoat materials are known to contain as their essential constituents binders containing epoxide groups and polycarboxylic acid crosslinking agents.

Examples of suitable powder slurry clearcoat materials are known, for example, from the U.S. patent U.S. Pat. No. 4,268,542 and the German patent applications DE-A-195 18 392.4 and DE-A-196 13 547 or are described in the German patent application DE-A-198 14 471.7, unpublished at the priority date of the present specification.

Powder slurry clearcoat materials are known to comprise powder clearcoat materials in dispersion in an aqueous medium.

UV-curable clearcoat materials are disclosed, for example, by the patents EP-A-0 540 884, EP-A-0 568 967 or U.S. Pat. No. 4,675,234.

Their familiar components are low molecular mass, oligomeric and/or polymeric compounds curable with actinic light and/or electron beams, preferably radiation-curable binders, based in particular on ethylenically unsaturated prepolymers and/or ethylenically unsaturated oligomers, one or more reactive diluents, if desired, and one or more photoinitiators, if desired. Examples of suitable radiation-curable binders are (meth) acryloyl-functional (meth)acrylic copolymers, polyether acrylates, polyester acrylates, unsaturated poly esters, epoxy acrylates, urethane acrylates, amino acrylates, melamine acrylates, silicone acrylates, and the corresponding methacrylates. Preference is given to using binders which are free of aromatic structural units.

It is, however, also possible to employ multicoat clearcoats, such as, for instance, a clearcoat based on hydroxyl-containing binders and blocked polyisocyanates and amino resins as crosslinking agents, which lies immediately atop the aqueous basecoat and atop which there is a further clearcoat based on binders containing carbamate and/or allophanate groups and on amino resins as crosslinking agents.

The sol-gel coatings of the invention which are produced preferably by the process of the invention from the coating materials of the invention are notable for outstanding scratch resistance coupled with very good adhesion, even following exposure to condensation. The appearance is also very good. The process of the invention is therefore suitable in particular for the painting of vehicle bodies, especially of automobile bodies, with multicoat paint systems, for industrial coating, including container coatings, and for furniture coating.

EXAMPLES

Preparation Example

The preparation of the inventive sol-gel clearcoat material

1. The Preparation of a Stock Varnish

A suitable reaction vessel was charged under nitrogen with 30 parts of fully deionized water, 40 parts of ethyl glycol, 5 parts of acetic acid (100% strength), 66.5 parts of methyltriethoxysilane and 4.7 parts of 3-glycidyloxypropyltrimethoxysilane and this initial charge was heated with stirring to 60° C. After a further 3 hours at 60° C., the reaction mixture was heated with stirring to 90° C. and held at this temperature for 2 hours more. Thereafter, 70 parts of the reaction mixture were distilled off azeotropically at 85° C. After the reaction mixture had been cooled to room temperature, 5 parts of methoxypropyl acetate and 0.1 part of BYK® 301 (leveling agent from BYK) were added to it. This gave the stock varnish 1, having a theoretical solids content of 37% by weight and an experimentally determined solids content of 46.9% by weight (1 hour/130° C.). For the preparation of a sol-gel clearcoat material 4b, the solid was adjusted to 40.3% by weight.

2. The Preparation of an Acrylate Copolymer for Modifying the Sol-Gel Clearcoat Material (Solution For Organic Modification 2).

An appropriate stirring vessel with reflux condenser and stirring was charged with 39 parts of ethoxyethyl propionate and this initial charge was heated to 130° C. In a first monomer feed vessel, a premix was formed from 9.598 parts of butyl methacrylate, 7.708 parts of methyl methacrylate, 8.003 parts of styrene, 4.253 parts of Methacrylester 13.0 (methacrylic ester with a long alkyl radical in the ester moiety) and 9.096 parts of hydroxyethyl acrylate. A second monomer feed vessel was charged with 3.810 parts of hydroxy-ethyl acrylate, 1.831 parts of acrylic acid and 0.916 part of ethoxyethyl propionate. An initiator feed vessel was charged with 3.692 parts of peroxide TBPEH (tert-butyl perethylhexanoate) and 6.025 parts of ethoxyethyl propionate. The contents of the first monomer feed vessel were metered into the reactor at a uniform rate over the course of four hours. After two hours and 30 minutes following the beginning of the first monomer feed, the second monomer feed was commenced. For this purpose, the contents of the second monomer feed vessel were metered into the reactor at a uniform rate over the course of one hour and 30 minutes. The contents of the initiator feed vessel were metered into the reactor at a uniform rate over the course of four hours and 30 minutes, the initiator feed being commenced five minutes before the first monomer feed. After the end of the feeds, the resulting reaction mixture was polymerized at 130° C. for two hours until an original viscosity of 2.2 dpas, a solids content of 50% by weight (15 minutes/180° C.) and an acid number of 30 mg KOH/g had been reached. Thereafter, the ethoxyethyl propionate was distilled off in vacuo at 100° C. until a solids content of 81% by weight (15 minutes/180° C.) had been reached. The resulting reaction mixture was cooled to 80° C. and adjusted with butyl glycol and ethoxyethyl propionate (weight ratio 5:1) to a solids content of 75% by weight.

For the preparation of the inventive sol-gel clearcoat material, the solution of the acrylate copolymer was adjusted with butyl glycol to a solids content of 20% by weight, to give the solution for organic modification 2.

3. The Preparation of an Additive Solution 15 parts of ethyl glycol, 2 parts of 2,3-epoxypropyl methacrylate (glycidyl methacrylate), 7.5 parts of 3-glycidyloxypropyltrimethoxysilane, 0.5 part of an adduct of maleic anhydride and 3-aminopropyltriethoxy-silane, and 0.1 part of azodicarboxamide (GenitronR AZDN-M) were mixed with one another at 100° C., with stirring, for six hours. This gave the additive solution 3, having an experimentally determined solids content of 40% by weight (15 minutes/180° C.).

The adduct itself was prepared by reacting 220 parts of 3-aminopropyltriethoxysilane and 100 parts of maleic anhydride with one another.

4. The Preparation of the Inventive Sol-Gel Clearcoat Materials 4a and 4b 4.1 The Sol-Gel Clearcoat Material 4a The sol-gel clearcoat material 4a was obtained by mixing in, with stirring and in succession, 14.77 parts of the solution for organic modification 2, 20.8 parts of methoxypropyl acetate, 0.014 part of BYK® 301, 1.57 parts of the additive solution 3, 0.8 part of Tinuvin® 384 and 0.6 part of Tinuvin® 123 (light stabilizers from Ciba-Geigy) with one another to 61.2 parts of the stock varnish 4 (46.9% strength by weight in ethyl glycol). To the resulting mixture there were added 7.0 parts of tetramethylammonium iodide solution (3% strength in 1:1 methanol/water). The resulting sol-gel clearcoat material 4a was stirred at room temperature for 30 minutes. It had a solids content of 32% by weight (15 minutes/180° C.). The sol-gel clearcoat material 4a was used to produce a sol-gel coating on a single-coat paint system based on a two-component (2K) solid-color topcoat material (example 1).

4.2 The 801-Gel Clearcoat Material 4b

The sol-gel clearcoat material 4b was obtained by adding, with stirring and in succession, 11.77 parts of the solution for organic modification 2, 14.89 parts of methoxypropyl acetate, 0.47 part of BYK® 301 and 1.57 parts of the additive solution 3 to 71.3 parts of the stock varnish 4 (40.3% strength by weight in ethyl glycol). The resulting sol-gel clearcoat material 4b was used to produce a sol-gel coating on a multicoat paint system with a clearcoat based on a commercially customary two-component (2K) clearcoat material (example 2).

Example 1

The production of an inventive sol-gel coating on a single-coat paint system

Steel panels coated cathodically with a commercially customary electrocoat material (electrodeposition coating with a film thickness of 18–22 µm) were first of all coated, using a cup-type gun, with a commercial primer-surfacer from BASF Coatings AG, and then baked. This gave a primer-surfacer coat having a film thickness of from 35 to 40 µm. Atop the primer-surfacer coat there was applied a commercial two-component (2K) solid-color topcoat material (AK66-1110 Ral 9005 Schwarz (black) from BASF Coatings AG), and initial drying and partial curing took place at 50° C. over 15 minutes.

After the panels had cooled, the sol-gel clearcoat material 4a was applied. Thereafter, the solid-color topcoat film and the sol-gel clearcoat film were cured together at 90° C. for 4 hours.

This gave a paint system having a solid-color topcoat with a thickness of 45 µm and the inventive sol-gel coating with a thickness of 8 µm. The paint system was free from cracks and gave a very good overall visual impression.

Example 2

The production of an inventive sol-gel coating on a multi-coat paint system

Steel panels coated cathodically with a commercially customary electrocoat material (electrodeposition coating with a film thickness of 18–22 µm) were first of all coated, using a cup-type gun, with a commercial primer-surfacer from BASF Coatings AG, and then baked. This gave a primer-surfacer coat having a film thickness of from 35 to 40 µm. Thereafter, a green aqueous metallic basecoat material (Ecostar$^R$ Dschungelgrün [jungle green] from BASF Coatings AG) was applied to the primer-surfacer in the same way and was initially dried at 80° C. for 10 minutes. After the panels had cooled, a film of a commercial two-component (2K) clearcoat material (FF95-0111 from BASF Coatings AG) was applied and was initially dried and partially cured at 80° C. for 10 minutes.

After the coated panels had cooled, the inventive sol-gel clearcoat material 4b in accordance with the preparation example was applied. The aqueous basecoat film, the clearcoat film, and the sol-gel clearcoat film were subsequently cured together at 150° C. over 300 minutes.

This gave a multicoat paint system comprising a basecoat with a thickness of 15 µm, a clearcoat with a thickness of 44 µm, an d the inventive sol-gel coating, with a thickness of 8 am. The paint system was free from cracks and gave a very good overall visual impression.

Example 3

The testing of th properties of th inv ntive sol-gel coatings of examples 1 and 2

3.1 Adhesion of the Sol-Gel Coating

Table 1 gives an overview of the tests conducted and the results obtained in those tests.

TABLE 1

Adhesive strength of the inventive sol-gel coatings

| Test methods | Example 1 | Example 2 |
|---|---|---|
| Scratch trial to DBL 7399 [rating 0 to 5] | 0 | 0 |
| Scratch trial after 240 hours of constant condensation conditioning [CCC] [rating 0 to 5] | 0 | 0 |
| Cross-hatch to DIN 53151 (2 mm) [rating 0 to 5] | 0 | 0 |
| Cross-hatch after 240 hours of CCC and 24 hours of regeneration | 0 | 0 |

[Rating 0 to 5]: 0 = best score; 5 = worst score

The results of table 1 demonstrate the outstanding adhesion of the inventive sol-gel coatings to the respective paint systems.

3.2 The Scratch Resistance of the Sol-Gel Coating
3.2.1 By the Brush Test For this test, the test panels were stored at room temperature for at least 2 weeks following application of the coating materials, before the test was conducted.

The scratch resistance of the sol-gel coating on the test panels was assessed using the BASF brush test described in FIG. 2 on page 28 of the article by P. Betz and A. Bartelt, Progress in Organic Coatings, 22 (1993), pages 27–37, albeit with modification in respect of the weight used (2 000 g instead of the 280 g specified therein), assessment taking place as follows:

In the test, the paint surface was damaged with a woven mesh which was loaded with a weight. The woven mesh and the paint surface were wetted copiously with a laundry detergent solution. The test panel was moved backward and forward under the woven mesh in reciprocating movements, by means of a motor drive.

The test element was an eraser (4.5×2.0 cm, broad side perpendicular to the direction of scratching) around which there was scratch ed a woven nylon mesh (No. 11, 31 $\mu$m mesh size, Tg 50° C.). The applied weight was 2 000 g.

Prior to each test, the woven mesh was replaced, with the running direction of the woven meshes parallel to the direction of scratching. Using a pipette, about 1 ml of a freshly stirred 0.25% Persil solution was applied in front of the eraser. The speed of rotation of the motor was set so as to perform 80 double strokes within a period of 80 s. After the test, the remaining detergent liquid was rinsed off with cold tap water and the test panel was blown dry with compressed air. Here, it became evident that the inventive sol-gel coatings had not been scratched away at all.

3.2.2 By the Sand Test

In addition, the scratch resistance was determined by the sand test. For this purpose, the paint surfaces we re loaded with sand (20 g of quartz silver sand, 1.5–2.0 mm). The sand was placed in a beaker (with its base cut off in a planar fashion) which was firmly fastened on the test panel. The test panels used were the same as those described above in the brush test. Using a motor drive, the panel with the beaker and the sand was set in shaking movements. The movement of the loose sand caused damage to the paint surface (100 double strokes in 20 s). Following sand exposure, the test area was cleaned to remove abraded material, wiped off carefully under a jet of cold water, and then dried using compressed air. Measurements were made of the gloss to DIN 67530 before and after damage.

Here it was found that, as a result of the exposure, the gloss fell by only 9 gloss units in the case of example 1 and by only 13 gloss units in the case of example 2, which is a further demonstration of the extremely high scratch resistance of the inventive sol-gel coating.

3.3.3 By Amtec

The scratch resistance was also determined in accordance with Amtec in the case of example 1. Here, the exposure produced a reduction in gloss by only 5 gloss units from the initial figure of 68, which further under-scores the high scratch resistance of the inventive sol-gel coating.

3.4 Chemical Resistance
3.4.1 Chemical Resistance by the Mb Gradient Oven Test For the MB gradient oven test, which is well known to the skilled worker, the test panels of examples 1 and 2 were subjected in a defined manner to damage by sulfuric acid, water, pancreatin and tree resin. For this purpose, the sample substances were applied with a spacing of one segment width in each case (setting of the gradient to 30–75° C. [1° C. per heating segment]). Following storage under standard climatic conditions at 23° C. for 72 hours, the test panels were exposed in a gradient oven (e.g., type: 2615 from BYK-Gardner) for 30 minutes. A determination was made of the temperature at which the first visible change occurred.

The results of testing are given in table 2.

TABLE 2

| Chemical resistance by the MB gradient oven test | | |
|---|---|---|
| Test substance | Example 1 1st marking at ° C. | Example 2 1st marking at ° C. |
| 1% strength sulfuric acid | 61 | 55 |
| Distilled water | >75 | >75 |
| Pancreatin | <50 | <50 |
| Tree resin | >75 | >75 |

The results of the MB gradient oven test underscore the high chemical resistance of the inventive sol-gel coating.

3.4.2 By the MEK Test

The solvent resistance of the inventive sol-gel coatings of examples 1 and 2 were tested in accordance with the provisions of the MEK test, which is well known to the skilled worker. Even after 200 double strokes with cotton pads soaked with methyl ethyl ketone, no instances of damage were evident.

3.5 Stone Chipping Test

The VDA [German Automakers' Association] stone chipping test with multi-impact exposure (2×500 grams/2 bar), which is known to those skilled in the art, gave a characteristic value of 3 and a rusting degree of 2 for both examples, 1 and 2. Accordingly, the inventive sol-gel coating together with the single-coat (example 1) and the multicoat (example 2) paint system, proved sufficiently stable with respect to stone chipping.

3.6 Erichsen Indentation

The Erichsen indentation to DIN EN ISO 1520: 1995–04 was 0.5 mm (example 1) and 0.4 mm (example 2).

What is claimed is:

1. A sol-gel coating material comprising
   (A) an acrylate copolymer solution comprising a reaction product of:
      a1) at least one (meth)acrylic ester that is substantially free of acid groups,
      a2) at least one ethylenically unsaturated monomer that carries at least one hydroxyl group per molecule and is substantially free of acid groups, and
      a3) at least one ethylenically unsaturated monomer that carries per molecule at least one acid group that can be converted into a corresponding acid anion group;
   (B) a stock varnish comprising a hydrolysis and condensation product of at least one hydrolyzable silane of the general formula I $$SiR_4 \qquad (I),$$

in which the variable R has the following definition:
   R=hydrolyzable groups, hydroxy groups, and nonhydrolyzable groups, with the proviso that at least one hydrolyzable group is present; and
   (C) an additive solution comprising
      c1) at least one ethylenically unsaturated compound containing at least one epoxide group,
      c2) at least one silane having at least one nonhydrolyzable group R that contains at least one epoxide group, and c3) at least one adduct of the at least one silane having at least one nonhydrolyzable group R that contains at least one amino group and at least one cyclic ethylenically unsaturated dicarboxylic anhydride.

2. The sol-gel coating material of claim 1, wherein the sol-gel coating material comprises, based on its overall amount, from 5 to 20% by weight of the acrylate copolymer solution, from 40 to 85% by weight of the stock varnish, and from 0.5 to 3% by weight of the additive solution.

3. The sol-gel coating material of claim 1, wherein the sol-gel coating material has a solids contents of the acrylate copolymer solution (A), stock varnish (B), and additive solution (C) in a weight ratio of (A):(B):(C) of (1 to 10):(30 to 60):(1).

4. The sol-gel coating material of claim 1, wherein the stock varnish comprises at least one hydrolyzable metal compound of the general formula II

$$MR_n \quad (II),$$

wherein:
M=aluminum, titanium, or zirconium,
R=hydrolyzable groups, hydroxy groups, and nonhydrolyzable groups, with the proviso that at least one hydrolyzable group is present, and
n=3 or 4.

5. The sol-gel coating material of claim 1, wherein
the nonhydrolyzable groups R are at least one of alkyl groups; alkenyl groups; alkynyl groups; and aryl groups; and
the hydrolyzable groups R are at least one of hydrogen atoms; alkoxy groups;
alkoxy-substituted alkoxy groups having from 3 to 20 carbon atoms; acyloxy groups;
and alkylcarbonyl groups.

6. The sol-gel, coating material of claim 5, wherein
the hydrolyzable groups R are at least one of methoxy, ethoxy, n-propoxy, i-propoxy, n-butoxy, sec-butoxy, beta-methoxyethoxy, acetoxy, propionyloxy, and acetyl groups; and
the nonhydrolyzable groups R are at least one of methyl, ethyl, propyl, butyl vinyl, 1-propenyl, 2-propenyl, butenyl, acetylenyl, propargyl, phenyl, and naphthyl groups.

7. The sol-gel coating material of claim 1, wherein the nonhydrolyzable group R contains at least one functional group.

8. The sol-gel coating material of claim 1, wherein the sol-gel coating material is a sol-gel clearcoat material.

9. A method comprising applying the sol-gel coating material of claim 1 to a substrate to produce a scratch-resistant sol-gel coating.

10. The method of claim 9, wherein the coating is fully cured.

11. The method of claim 9, wherein the coating is one of an automotive OEM coating, an automotive refinish coating, an industrial coating, a container coating, a plastic coating, and a furniture coating.

12. A process for producing scratch-resistant sol-gel coatings comprising applying and curing the sol-get coating material of claim 1 on one of a primed substrate, an unprimed substrate, an unprimed substrate comprising a single- or multi-coat paint system, and a primed substrate comprising a single- or multi-coat paint system.

13. A process for producing scratch-resistant sol-gel coatings comprising applying and curing a sol-gel coating material on one of an unprimed substrate and a primed substrate, wherein prior to the applying of the sol-gel coating material, at least one of:
(i1) a single-coat paint system that is at least one of a one-component clearcoat material, a two-component clearcoat material, a multicomponent clearcoat material, a two-component powder clearcoat material, a multicomponent clearcoat material, a two component UV-curable clearcoat material, and a multicomponent UV-curable clearcoat material;
(i2) at least one of a multicoat color paint system and a multicoat effect paint system comprising a topmost coat comprising at least one of a one-component clearcoat material, a two-component clearcoat material, a multicomponent clearcoat material, a two component powder clearcoat material, a multicomponent powder clearcoat material, a two component UV-curable clearcoat material, and a multicomponent UV-curable clearcoat material; and
(i3) at least one of a single-coat color paint system comprising a two-component solid-color topcoat material and a single-coat effect paint system comprising a two-component solid-color topcoat material;
is applied and at least partially cured.

14. The process of claim 13, wherein the sol-gel coating material comprises
(A) an acrylate copolymer solution comprising a reaction product of:
a1) at least one (meth)acrylic ester that is substantially free of acid groups,
a2) at least one ethylenically unsaturated monomer that carries at least one hydroxyl group per molecule and is substantially free of acid groups, and
a3) at least one ethylenically unsaturated monomer that carries per molecule at least one acid group that can be converted into the corresponding acid anion group;
(B) a stock varnish comprising a hydrolysis and condensation product of at least one hydrolyzable silane of the general formula I

$$SiR_4 \quad (I),$$

in which the variable R has the following definition:
R=hydrolyzable groups, hydroxy groups, and nonhydrolyzable groups, with the proviso that at least one hydrolyzable group is present; and
(C) an additive solution comprising
c1) at least one ethylenically unsaturated compound containing at least one epoxide group,
c2) at least one silane having at least one nonhydrolyzable group R that contains at least one epoxide group, and
c3) at least one adduct of the at least one silane having at least one nonhydrolyzable group R that contains at least one amino group and at least one cyclic ethylenically unsaturated dicarboxylic anhydride.

15. The process of claim 12, wherein the applied sol-gel coating material is cured by exposure to middle-range IR radiation.

16. The process of claim 12, wherein the paint system is at least one of an automotive OEM paint system, an automotive refinish paint system, an industrial coating paint system, a container coating paint system, and a furniture coating paint system.

17. A sol-gel coating comprising the sol-gel coating material of claim 1.

18. A substrate comprising at least one sol-gel coating of claim 17.

19. The sol-gel coating material of claim 7, wherein the at least one functional group is at least one of an epoxide group, an amino group, an olefinically unsaturated group, a mercapto group, an isocyanate group, and a reaction product of any of the preceding with further reactive compounds.

20. The sol-gel coating material of claim 1, wherein at least two of:
   a. the sol-gel coating material comprises, based on its overall amount, from 5 to 20% by weight of the acrylate copolymer solution, from 40 to 85% by weight of the stock varnish, and from 0.5 to 3% by weight of the additive solution;
   b. the sol-gel coating material has a solids contents of the acrylate copolymer solution (A), stock varnish (B), and additive solution (C) in a weight ratio of (A):(B):(C) of (1 to 10):(30 to 60):(1);
   c. the stock varnish comprises at least one hydrolyzable metal compound of the general formula II $$MR_n \quad (II),$$

wherein:
   M=aluminum, titanium, or zirconium,
   R=hydrolyzable groups, hydroxy groups, and non-hydrolyzable groups, with the proviso that at least one hydrolyzable group is present, and
   n=3 or 4
   d. the nonhydrolyzable groups R are at least one of alkyl groups; alkenyl groups; alkynyl groups; and aryl groups; and the hydrolyzable groups R are at least one of hydrogen atoms; alkoxy groups; alkoxy-substituted alkoxy groups having from 3 to 20 carbon atoms; acyloxy groups; and alkylcarbonyl groups;
   e. the nonhydrolyzable groups R contain at least one functional group; and
   f. the sol-gel coating material is a sol-gel clearcoat material.

21. The sol-gel coating material of claim 20, wherein at least one of:
   a. the hydrolyzable groups R are at least one of methoxy, ethoxy, n-propoxy, i-propoxy, n-butoxy, sec-butoxy, beta-methoxyethoxy, acetoxy, propionyloxy, and acetyl groups; and the nonhydrolyzable groups R are at least one of methyl, ethyl, propyl, butyl vinyl, 1-propenyl, 2-propenyl, butenyl, acetylenyl, propargyl, phenyl, and naphthyl groups; and
   b. the at least one functional group is at least one of an epoxide group, an amino group, an olefinically unsaturated group, a mercapto group, an isocyanate group, and a reaction product thereof with further reactive compounds.

22. A sol-gel coating comprising the sol-gel coating material of claim 20.

23. A substrate comprising at least one sol-gel coating of claim 22.

24. The process of claim 14, wherein at least one of:
   a. the sot-gel coating material comprises, based on its overall amount, from 5 to 20% by weight of the acrylate copolymer solution, from 40 to 85% by weight of the stock varnish, and from 0.5 to 3% by weight of the additive solution;
   b. the sol-gel coating material has a solids contents of the acrylate copolymer solution (A), stock varnish (B), and additive solution (C) in a weight ratio of (A):(B):(C) of (1 to 10):(30 to 60):(1);
   c. the stock varnish comprises at least one hydrolyzable metal compound of the general formula II $$MR_n \quad (II),$$

wherein:
   M=aluminum, titanium, or zirconium,
   R=hydrolyzable groups, hydroxy groups, and non-hydrolyzable groups, with the proviso that at least one hydrolyzable group is present, and
   n=3 or 4
   d. the nonhydrolyzable groups R are at least one of alkyl groups; alkenyl groups; alkynyl groups; and aryl groups; and the hydrolyzable groups R are at least one of hydrogen atoms; alkoxy groups; alkoxy-substituted alkoxy groups having from 3 to 20 carbon atoms; acyloxy groups; and alkylcarbonyl groups;
   e. the nonhydrolyzable groups R contain at least one functional group; and
   f. the sol-gel coating material is a sol-gel clearcoat material.

25. The process of claim 24, wherein at least one of:
   a. the hydrolyzable groups R are at least one of methoxy, ethoxy, n-propoxy, i-propoxy, n-butoxy, sec-butoxy, beta-methoxyethoxy, acetoxy, propionyloxy, and acetyl groups; and the nonhydrolyzable groups R are at least one of methyl, ethyl, propyl, butyl vinyl, 1-propenyl, 2-propenyl, butenyl, acetylenyl, propargyl, phenyl, and naphthyl groups; and
   b. the at least one functional group is at least one of an epoxide group, an amino group, an olefinically unsaturated group, a mercapto group, an isocyanate group, and a reaction product thereof with further reactive compounds.

26. A sol-gel coating produced by the process of claim 24.

27. A substrate comprising at least one sol-gel coating of claim 26.

28. A sol-gel coating produced by the process of claim 12.

29. A substrate comprising at least one sol-gel coating of claim 28.

30. A sol-gel coating produced by the process of claim 13.

31. A substrate comprising at least one sol-gel coating of claim 30.

32. A sol-gel coating produced by the process of claim 14.

33. A substrate comprising at least one sol-gel coating of claim 32.

* * * * *